United States Patent [19]

Yoshida et al.

[11] 4,078,029

[45] Mar. 7, 1978

[54] PROCESS FOR PREPARING MOLD

[75] Inventors: Akitoshi Yoshida; Masaharu Kosaka; Akira Kitajima, all of Funabashi, Japan

[73] Assignee: Nissan Chemical Industries, Ltd., Tokyo, Japan

[21] Appl. No.: 725,946

[22] Filed: Sep. 23, 1976

[51] Int. Cl.$^2$ .............................................. C04B 35/64
[52] U.S. Cl. .................................. 264/63; 106/38.27; 106/38.35; 264/225
[58] Field of Search ........................ 106/38.3, 38.27; 264/63, 225

[56] References Cited

U.S. PATENT DOCUMENTS 3,537,949  11/1970  Brown et al. ............... 106/38.27
3,655,578  4/1972   Yates ............................ 106/38.3

Primary Examiner—Donald J. Arnold
Assistant Examiner—John A. Parrish
Attorney, Agent, or Firm—Oblon, Fisher, Spivak, McClelland & Maier

[57] ABSTRACT

A process for preparing a mold by preparing a slurry of refractory powder in a binder solution comprising silica sol and monomethyl triethanol ammonium silicate or tetraethanol ammonium silicate at a mole ratio of $SiO_2/M_2O$ of 10 to 22 and a mole ratio of $SiO_2/NR$ of 9 to 28 wherein M represents Li or Na and NR represents monoethyl triethanol ammonium hydroxide or tetraethanol ammonium hydroxide, and repeating an overcoating of said slurry and a refractory powder by coating said slurry on a pattern, sanding said refractory powder on the coated pattern and drying it to form a green mold, separating said green mold from said pattern and calcining said green mold.

5 Claims, No Drawings

PROCESS FOR PREPARING MOLD

BACKGROUND OF THE INVENTION

1. Field of the Invention:

The present invention relates to an improved process for preparing a mold having high accuracy.

It has been known to prepare molds by repeating steps of coating a slurry of a refractory powder in a binder solution on a pattern made of wax and sanding with a refractory powder on the coated pattern and drying it to form a green mold of the coated layer and then separating the wax and calcining the green mold.

However, it has not been industrially prepared desired molds by said method because suitable binder has not been found.

When sodium silicate is used as the binder, the calcined molds have relatively low refractoriness whereby it could be used only for casting of a metal having low melting point, and the water resistance of the green mold is low whereby the dewaxing method using a hot water or an autoclave could not be applied, disadvantageously.

When the silica sol is used as a binder, the strength of the calcined mold is not enough and the dewaxing method using a hot water could not be applied disadvantageously.

When an alkyl silicate is used as a binder, the stability of the slurry is not enough whereby it could not be applied for an industrial purpose.

When a quaternary ammonium silicate is used as a binder, desired mold could not be obtained as the case of the binder of silica sol.

The product is expensive whereby it could not be used in an industrial purpose. Various proposals of improvements of processes for preparing molds have been found. These proposed processes include methods using combined binders. However, certain disadvantages of the binders have been found and the optimum process for preparing desired mold has not been found.

2. Summary of the Invention:

It is an object of the present invention to provide a shell mold having high accuracy which has desired strength and is not deformed nor cracked.

Another object of the present invention is to provide a process for preparing a green mold or a calcined mold having high accuracy.

The other object of the present invention is to provide a process for preparing a mold by using a slurry which can be used for repeatedly overcoating for short-interval without sloughing off during the coating, and can be used for imparting high strength for green mold and has stability for a long period.

These objects of the present invention have been attained by preparing a slurry of a refractory powder in a binder solution comprising silica sol and monomethyl triethanol ammonium silicate or tetraethanol ammonium silicate at a mole ratio of $SiO_2/M_2O$ of 10 to 22 and a mole ratio of $SiO_2/NR$ of 9 to 28 wherein M represents Li or Na, and NR represents monomethyl triethanol ammonium hydroxide or tetraethanol ammonium hydroxide, and repeating an overcoating of said slurry and a refractory powder by coating said slurry on a pattern, sanding said refractory powder on the coated pattern and drying it to form a green mold, separating said green mold from said pattern, and calcining said green mold.

DETAILED DESCRIPTION OF THE PREFERRED EMBODIMENTS:

The binder solution used in the process of the invention comprises the silica sol and monomethyl triethnol ammonium silicate or tetraethanol ammonium silicate in the following conditions:

(a) a mole ratio of $SiO_2/M_2O$ is in a range of 10 to 22.
(b) a mole ratio of $SiO_2/NR$ is in a range of 9 to 28.
(c) a content of $SiO_2$ is in a range of 7 to 40 wt.%.
(d) a viscosity of the binder solution after maintaining at 80° C for 24 hours in a sealed vessel and then cooling it to room temperature is less than 5 times of the viscosity before ageing.

When the mole ratio of $SiO_2/M_2O$ is less than 10, the sloughing off of the coated layer is caused in the coating operation if the interval of overcoating is short such as shorter than 1 hour, moreover, a deformation of the overcoated layer is easily caused whereby crackings are easily caused, and accordingly, it is difficult to prepare a mold having high accuracy.

Furthermore, the strength of the mold is too high after the calcination whereby it is difficult to break the mold after casting because of high ceramization.

When the mole ratio of $SiO_2/M_2O$ is higher than 22, the strength of the green mold is too low and the strength of the calcined mold is too low and the caking of the refractory powder in the slurry is highly caused. The strength of the green mold is too low whereby it is difficult to shorten the interval for repeating the overcoatings.

When the mole ratio of $SiO_2/NR$ is lower than 9, the coated layer formed by drying after the former coating is easily dissolved in the slurry for the next coating whereby the strength of the calcined mold is remarkably low and stimulative amine vapor is generated to cause a trouble in the operation.

When the mole ratio of $SiO_2/NR$ is higher than 28, the strength of the green mold is not enough whereby it is difficult to shorten the interval for repeating the overcoatings and the pot-life of the slurry is too short so as to cause a trouble in the operation.

When the content of $SiO_2$ is less than 7 wt.%, the strength of green mold and the calcined mold is too low and the smoothness of the surface of the shell is inferior whereby desired mold can not be obtained.

When the content of $SiO_2$ is higher than 40 wt.%, the crackings of the coated layer are caused and the pot life of the slurry is short to cause low stability of the slurry and the sloughing off in the overcoating step is caused.

The condition (d) is one of the important ones which can be attained by suitable selection of the components used in the binder solution.

The molds having desired strength may be obtained by improving bonding property of silica by the synergistic effect of suitable amount of alkali metal oxide and the specific organic base of monomethyl triethanol ammonium hydroxide or tetraethanol ammonium hydroxide.

It is considered that the calcined molds have desired strength without forming unbreakable molds because the specific organic base is burnt or vaporized to form voids in the molds and the degree of sintering of the silica and the alkalimetal oxide is controlled.

It is considered that the caking of the refractory powder in the slurry can be prevented by the dispersing effects of suitable amount of the alkali metal oxide and the specific organic base in the binder solution. The slurries of the refractory powder in the binder solution have long pot life because silica particles in the binder solution having the condition (d) are in highly stable condition and the characteristic of the binder solution is maintained without affect of materials which are dissolved from the refractory powder or the other additives.

It is considered that the interval for coatings can be shortened by remarkable improvement of water resistance of the binder resulted by the election of the mole ratio of $SiO_2/M_2O$ and the mole ratio of $SiO_2/NR$, whereby the dissolution of the coated layer into the slurry in the next coating can be prevented even though a complete drying of the coated layer is not accomplished, and the sloughing off of the coated layer caused by absorbing the slurry can be prevented.

The binders used in the present invention are prepared by selecting the types and contents of $M_2O$ and NR and the content of $SiO_2$ and the order of the addition, so as to give the conditions (a) to (d).

In the process of the invention, it is preferable to use the binder solution having a mole ratio of $SiO_2/M_2O$ of 11 to 15 and a mole ratio of $SiO_2/NR$ of 10 to 18 wherein M is Li or Na and NR is monomethyl triethanol ammonium hydroxide.

The binder solutions used in the process of the invention can be prepared by mixing a silica sol having a mole ratio of $SiO_2/M_2O$ of 50 to 2,000, a silica sol having a mole ratio of $SiO_2/M_2O$ of 4 to 10, an alkali silicate, a solution of monomethyl triethanol ammonium silicate or tetraethanol ammonium silicate having a mole ratio of $SiO_2/NR$ of 0.1 to 50, alkali metal hydroxide, monomethyl triethanol ammonium hydroxide, tetraethanol ammonium hydroxide etc.

The components $M_2O$ and NR are derived from these starting materials.

The silica sol and the silicates can be produced by the conventional technique. The preferable binder solutions are prepared by mixing the silica sol, a solution of the specific organic base and an alkali silicate.

It is preferable to use water as the medium for the binder solution used in the process of the invention. A part or whole of the medium can be hydrophilic organic solvents such as methanol, ethanol, isopropanol, ethylene glycol, glycerine, acetone, methylethyl ketone etc.

The medium in the binder solution can be the medium in the silica sol, the solution of the specific organic base etc., and also can be a medium which are newly added.

The refractory powders used in the process of the invention can be refractory in organic powder containing alumina, silica, zirconia and titania which have particle size of 20 to 500 mesh as a main component. Suitable refractory powders include zircon flour, zircon sand, chamotte sand, fuzed quartz powder etc..

The patterns for the molds (master) can be made of a wax, a plastic, wood an alloy having low melting point etc.. It is especially preferable to use a wax or a meltable plastic.

The slurry used in the process of the invention can be prepared by intimately mixing the binder solution and the refractory powder. It is possible to add desired additive such as surfactants, antifoaming agents, viscosity improvers, dispersing agents etc..

It is also possible to add an emulsion of synthetic resin as an auxiliary binder.

The green molds used in the process of the invention can be prepared by coating the slurry on the pattern and sanding the refractory powder on the coated pattern and drying it, and repeating the three steps for 5 to 10 times.

The coating step can be conducted by a method of dipping the pattern into the slurry, a method of spraying the slurry.

The drying step can be conducted at room temperature for 1 to 4 hours and can be conducted at higher temperature for shortening the time.

The green mold can be formed by accumulating the coated layers of the slurry and the refractory powder on the pattern.

The pattern can be removed by a melt-flow, a combustion etc.. For example, a wax pattern can be removed by a method of separation using hot water or a method of separation applying hot water under high pressure in an autoclave or a thermal shock at high temperature.

The green mold can be calcined at 900° to 1200° C to obtain the calcined mold having suitable strength.

In accordance with the process of the invention, the interval for coatings can be shortened. The sloughing off is not caused in the coating step and the green mold having high strength can be obtained and has enough water resistance in the step of separating the pattern using hot water, the calcined mold has no deformation nor cracking and has high refractoriness and suitable strength and can be easily broken after casting.

The invention will be illustrated by certain examples wherein the percent means percent by weight.

PREPARATION 1

An aqueous solution of sodium silicate containing 4.5% of $SiO_2$ and having mole ratio of $SiO_2/NaO$ of 2.7 was passed through a column filled with H type ion exchange resin to obtain a silica sol.

A 10% sodium hydroxide aqueous solution and 30% tetraethanol ammonium hydroxide aqueous solution were admixed with the silica sol to give the mole ratios shown in Table 1.

The mixture was stirred at 86° C for 12 hours in ageing and then was concentrated to obtain the samples.

REFERENCE 1

In the reference, an aqueous dispersion of silica sol containing 20% of $SiO_2$ and 10% sodium hydroxide aqueous solution and 30% tetraethanol ammonium hydroxide aqueous solution were mixed to prepare a binder solution containing the components shown in Table 1.

PREPARATION 2

In this preparation, an aqueous dispersion of silica sol containing 30% of $SiO_2$ and 50% monomethyl triethanol ammonium hydroxide aqueous solution were mixed and then an aqueous solution of sodium silicate containing 15% of $SiO_2$ and having a mole ratio of $SiO_2/Na_2O$ of 3.0 was admixed to the mixture and then the total mixture was stirred for 2 hours to obtain the sample.

REFERENCE 2-1

In the reference, the process of Preparation 2 was repeated except adjusting the mole ratio of $SiO_2/Na_2O$ to 7.5.

REFERENCE 2-2

In the reference, the process of Preparation 2 was repeated except adjusting the mole ratio of $SiO_2/NR$ to 40.

PREPARATION 3

An aqueous solution of lithium silicate containing 25% of $SiO_2$ and having a mole ratio of $SiO_2/Li_2O$ of 3.5, and the silica sol of Preparation 1 and the monomethyl triethanol ammonium hydroxide aqueous solution were mixed and the mixture was concentrated at a boiling temperature of 85° C under a reduced pressure to the concentration shown in Table 1.

REFERENCE 3

In the reference 3, the process of Preparation 3 was repeated except concentrating the mixture to give 42% of the content of $SiO_2$.

Table 1:

|  | (a) mole ratio $SiO_2/M_2O$ ($M_2O$) | (b) mole ratio $SiO_2/NR$ | (c) content of $SiO_2$ (%) | (d) viscosities before and after treatment at 80° C for 24 hours before/after |
|---|---|---|---|---|
| Preparation 1 | 10 ($Na_2O$) | 9 | 17.5 | 2.6/6.5 |
| Reference 1 | 10 ($Na_2O$) | 9 | 17.5 | 6.3/49.2 * |
| Preparation 2 | 12.5($Na_2O$) | 12.5 | 25.0 | 3.6/3.9 |
| Reference 2-1 | 58 * ($Na_2O$) | 12.5 | 25.0 | 3.8/4.9 |
| Reference 2-2 | 12.5 ($Na_2O$) | 40 * | 25.0 | 3.3/8.4 |
| Preparation 3 | 20 ($Li_2O$) | 25 | 21.0 | 2.9/3.1 |
| Reference 3 | 20 ($Li_2O$) | 25 | 42.0 * | 15.8/189 * |

Note: * undesired conditions

Preparations of slurries of refractory powder and molds and evaluations thereof:

EXAMPLE 1

A slurry for first coating which had a viscosity of 45 seconds measured by Zahn cup viscometer No. 4 was prepared by admixing 2000 g of the binder solution of Preparation 1, 3 g of triethanol amine dodecylbenzenesulfonate and 5 g of octanol as an antifoaming agent with 2500 g of zircon flour (350 mesh) and 600 g of zircon flour (200 mesh).

A slurry for second and following coating which had a viscosity of 13 seconds measured by Zahn cup viscometer No. 4, was prepared by admixing the same components except varying the amount of the binder solution to 2300 g.

A wax pattern was dipped into the slurry for first coating and taken up in a room at 20 ± 3° C and 63% of relative humidity. A zircon sand (80 mesh) was applied on the surface of the pattern. After setting it for 1 hour, the coated pattern was dipped into the slurry for second coating and was taken up and then a zircon sand (80 mesh) was applied on the surface. After setting it for 1 hour, the same operation of the coating of the slurry and the sanding of the zircon sand was repeated for the third to sixth coatings and sandings.

In the sandings, after the third to fifth coatings, chamotte sands having each average diameter of about 0.6 mm, about 1.2 mm and about 1.2 mm were respectively applied. After the sixth coating, no sanding was conducted.

The resulting shell had high density and high strength.

The result of the evaluation is shown in Table 2.

COMPARATIVE EXAMPLE 1

In accordance with the process of Example 1 except using the binder solution of Reference 1, the slurry and the mold were prepared.

The result of the evaluation is shown in Table 2.

EXAMPLE 2

In accordance with the process of Example 1 except using the binder solution of Preparation 2, the slurry and the mold were prepared.

The result is shown in Table 2.

COMPARATIVE EXAMPLES 2-1 AND 2-2

In accordance with the process of Example 1 except using each binder solution of Reference 2-1 or 2-2, the slurry and the mold were prepared. In the comparative examples, each interval for coating was prolonged to 1.5 hours for the case 2-1 and 2 hours for the case 2-2, because of sloughing off.

The results are shown in Table 2.

EXAMPLE 3

In accordance with the process of Example 1 except using the binder solution of Preparation 3 and 1700 g of fused quartz powder (325 mesh 90% pass) and 4500 g of fused quartz powder (325 mesh 50% pass) as the refractory powder for the slurry and using fused quartz powder (90 mesh pass) for sandings of the first and the second coatings, the slurry and the mold were prepared.

The results are shown in Table 2.

When the fused quartz was used as the refractory powder, the strength of the mold was about 50 to 70% of the strength of the mold using zircon. The strength of the mold was suitable for breaking after casting.

COMPARATIVE EXAMPLE 3

In accordance with the process of Example 3 except using the binder solution of Reference 3, the slurry and the mold were prepared. Since the content of $SiO_2$ was high, a large amount of the binder solution was needed to obtain the slurry.

The refractory shells prepared by the processes of Examples 1, 2 and 3, were respectively treated at 1000° C by the thermal shock method for separating the wax and were calcined at 1050° C for 1.5 hours.

A molten metal of stainless steel SUS 27 (at 1680° C) was casted by using the refractory shells. No deformation of the shell, nor mold reaction was found. The breakings of the shells after casting the molten metal were easily accomplished.

When a separation of the wax was conducted in the conditions of 7 Kg/cm² for 5 minutes in an autoclave, and the molten metal was casted, desired results were also given.

Table 2:

|  | Example 1 | Reference 1 | Example 2 |  |
|---|---|---|---|---|
| Bending strength of green mold after drying ($Kg/cm^2$) room temp. for 24 hours | 46 | 22 slightly low | 63 |  |
| Strength of calcined mold at 950° C for 1.5 hours ($Kg/cm^2$) | 95 | 68 slightly brittle | 92 |  |
| Interval for coatings (minimum) | 50 min. | longer than 1 hour | 1 hour |  |
| Caking of refractory powder in slurry | no caking dispersible after sedimentation | no caking dispersible after sedimentation | no caking dispersible after sedimentation |  |
| Stability of slurry | dispersible after ageing for 14 days in seal | viscous after ageing for 5 days in seal | dispersible after ageing for 1 month in seal |  |
|  | Example 3 | Reference 2-1 | Reference 2-2 | Reference 3 |
| Bending strength of green mold after drying room temp. for 24 hours ($Kg/cm^2$) | 38 | 35 (comp. Exp. 2) | 42 | 45 |
| Strength of calcined mold at 950° C for 1.5 hours ($Kg/cm^2$) | 63 | 75 | 115 breaking of mold is difficult | 52 crackings are formed |
| Interval for coatings (minimum) | 50 minutes | sloughing when shorter than 1.5 hr. | sloughing when shorter than 2 hr. | longer than 1.5 hrs. |
| Caking of refractory powder in slurry | no caking dispersible after sedimentation | * | * | * |
| Stability of slurry | dispersible after ageing for 7 days in seal | dispersible after aging for 7 days in seal | dispersible after ageing for 7 days in seal | gelation after aging for 2 days in seal |

* caking and non-dispersible

What we claim is:

1. A process for preparing a mold which comprises preparing a slurry of a refractory powder in a binder solution consisting essentially of silica sol at a mole ratio of $SiO_2/M_2O$ of 10 to 22 and a material selected from the group consisting of monomethyl triethanol ammonium silicate and tetraethanol ammonium silicate at and a mole ratio of $SiO_2/NR$ of 9 to 28 where M represents a metal selected from the group consisting of Li and Na and NR represents a material selected from the group consisting of monomethyl triethanol ammonium hydroxide and tetraethanol ammonium hydroxide, repeatedly coating a suitable pattern and then drying to form a green mold, separating said green mold from said pattern, and calcining said green mold.

2. The process of claim 1 wherein said binder solution has the property of achieving a stable viscosity less than 5 times that of the solution prior to ageing when aged at 80° C for 24 hours.

3. A process according to claim 1, wherein said binder solution is prepared by admixing a silica sol having a mole ratio of $SiO_2/M_2O$ of 50 to 2000 with an aqueous solution of a material selected from the group consisting of sodium hydroxide and lithium hydroxide and an aqueous solution selected from the group consisting of monomethyl triethanol ammonium hydroxide and tetraethanol ammonium hydroxide.

4. A process according to claim 1 wherein said binder solution is prepared by admixing an aqueous silica sol having a mole ratio of $SiO_2/M_2O$ of 50 to 2000 with an aqueous solution of an alkali silicate having a mole ratio of $SiO_2/M_2O$ of 2 to 6 and an aqueous solution selected from the group consisting of monomethyl triethanol ammonium hydroxide and tetraethanol ammonium hydroxide.

5. A process according to claim 1 wherein said refractory powder is selected from the group consisting of zircon flour, zircon sand, chamotte sand and fused quartz powder which has a particle size of 20 to 500 mesh.

* * * * *